United States Patent
Zansky et al.

(10) Patent No.: US 8,084,885 B1
(45) Date of Patent: Dec. 27, 2011

(54) SYSTEM FOR PARALLELING POWER SUPPLIES

(75) Inventors: Zoltan Zansky, Sunnyvale, CA (US); Roshan Thakur, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 240 days.

(21) Appl. No.: 12/148,743

(22) Filed: Apr. 21, 2008

(51) Int. Cl.
*H02J 1/04* (2006.01)
(52) U.S. Cl. .......................................... 307/60
(58) Field of Classification Search .................. 307/60, 307/18, 31, 65
See application file for complete search history.

(56) References Cited

U.S. PATENT DOCUMENTS

| | | | | |
|---|---|---|---|---|
| 4,270,165 A | * | 5/1981 | Carpenter et al. | 363/65 |
| 4,356,403 A | * | 10/1982 | Mohat | 307/60 |
| 4,618,779 A | * | 10/1986 | Wiscombe | 307/60 |
| 5,672,958 A | * | 9/1997 | Brown et al. | 323/269 |
| 2009/0160500 A1 | * | 6/2009 | Niculae et al. | 327/109 |

OTHER PUBLICATIONS

Bob Mammano, et al., Load Sharing with Paralleled Power Supplies, Load Sharing with Paralleled Power Supplies, Sep. 1991, pp. 2-1 through 2-14, Publisher: Unitrode Corporation; Copyright 2001 Texas Instruments Incorporated, Published in: US.

* cited by examiner

*Primary Examiner* — Robert L. Deberadinis
(74) *Attorney, Agent, or Firm* — Suiter Swantz pc llo

(57) ABSTRACT

A turbo compounding system may include a turbo generator having a switched reluctance machine having at least one pole-matched rotor and stator pair, a single phase inverter coupled to the turbo generator and further coupled to a direct current link, an inverter coupled to the direct current link, a motor generator coupled to the inverter.

20 Claims, 4 Drawing Sheets

US 8,084,885 B1

SYSTEM FOR PARALLELING POWER SUPPLIES

TECHNICAL FIELD

The present disclosure generally relates to the field of power supply systems, and more particularly to a system for paralleling power supplies.

BACKGROUND

Electrical energy in the form of Alternating Current (AC) is a commonly available power source found in buildings, including homes. AC power is typically supplied by a central utility via power lines or from a physical plant that is part of a facility. However, many common devices, including electronic circuits and DC motors, utilize electrical energy in the form of Direct Current (DC), which is electrical current that flows in only one direction. Thus, it is often desirable to convert AC power to DC power.

Power supply systems convert AC power to DC power suitable for powering electrical components, also known as a load. It is often desirable to combine multiple redundant power supplies in parallel to supply a given load requirement. When power supplies are combined in parallel, the output of each power supply may be combined to produce a shared output, or common output load. When multiple power supplies are combined in parallel, reliability and efficiency for the power supply system may be improved. Redundant parallel-connected power supplies may increase reliability for the overall power supply system whereby a failure of a power supply will cause other power supplies to supply enough current for support of a maximum load.

SUMMARY

Accordingly, the present disclosure is directed to a system for paralleling power supplies. In one embodiment, a system for paralleling power supplies may be connected to multiple power supplies to parallel the power supplies with approximately equal current sharing amongst the multiple power supplies. A system for paralleling power supplies may include a parallel controlling logic and may be coupled to a load output terminal of each power supply and a remote sense terminal of each power supply to share current amongst the multiple power supplies.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 2:
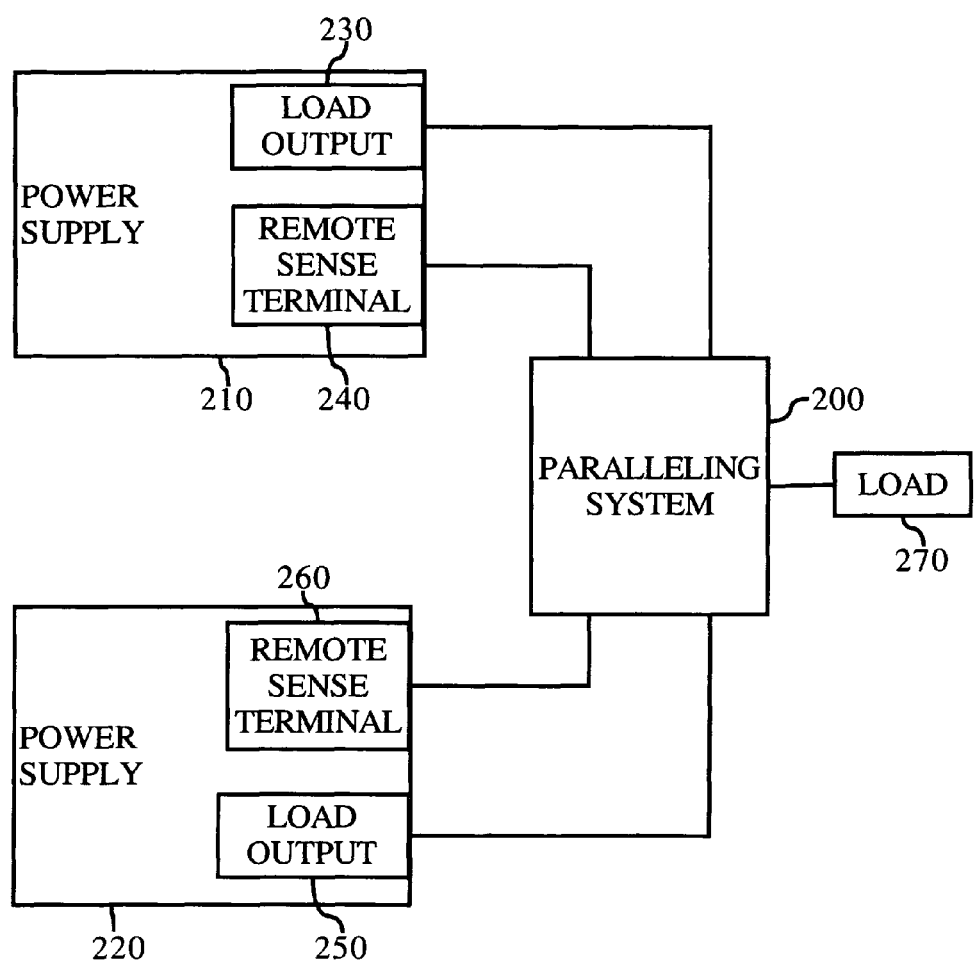
FIG. 2 is a diagram illustrating a paralleling system for paralleling power supplies.
Figure 3:
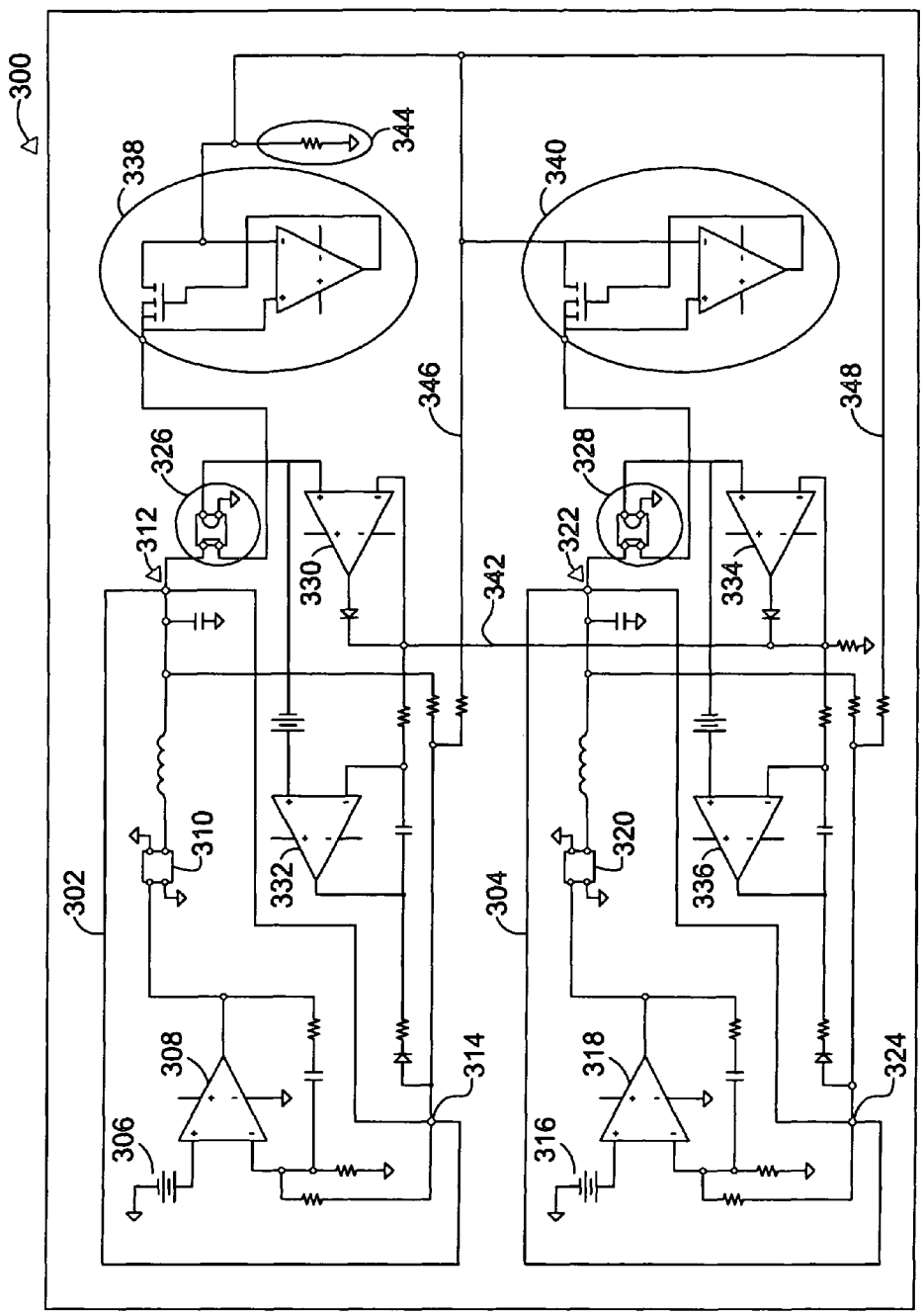
FIG. 3 is a circuit diagram illustrating a paralleling system for paralleling power supplies.

Referring generally to FIGS. 2 through 3, a paralleling system for paralleling power supplies connected to multiple power supplies to parallel the power supplies with approximately equal current sharing amongst the multiple power supplies. Paralleled power supplies may refer to independent power supplies which are combined to form a shared output, also known as a common output load. Paralleled power supplies may combine multiple power supplies in a power supply system to supply power for a given load requirement. A power supply system with paralleled power supplies may provide enhanced reliability through redundancy whereby a failure of a single power supply may be overcome through operation of another power supply. Additionally, a power supply system with paralleled power supplies for a given load may produce additional benefits including form factor considerations and heat removal.

For example, it is contemplated that paralleling system for paralleling power supplies may be employed in information handling systems, such as a computing system of a data storage system and/or storage rack, shelf and the like. Data storage systems require a reliable power system to ensure valid read and write access to data on a continuous basis. A factor of efficient operation of data storage systems is heat removal. Components such as modules containing processor units or power supplies may also require more cooling capacity. Data storage systems and information handling systems require proper airflow over waste heat generating components, such as power supplies. Through employment of multiple power supplies in combination with the paralleling system of the present invention, the form factor of the power supplies may be reduced and heat generated from the power supplies may be reduced. Consequently, a data storage system employing a power supply system of the present invention may increase reliability of the data storage system with more efficient heat removal.

While power supply systems may be paralleled, load current may not be equally shared amongst multiple power supplies. A drawback associated with unequal current load sharing is the stress placed on individual power supplies. For example, a first power supply of a paralleled power supply system may be operating at a higher current load and a higher temperature than a second power supply of the paralleled power supply system. A power supply that operates at a higher temperature reduces reliability of the power supply and negatively affects the reliability of the overall power supply system.

Figure 1:
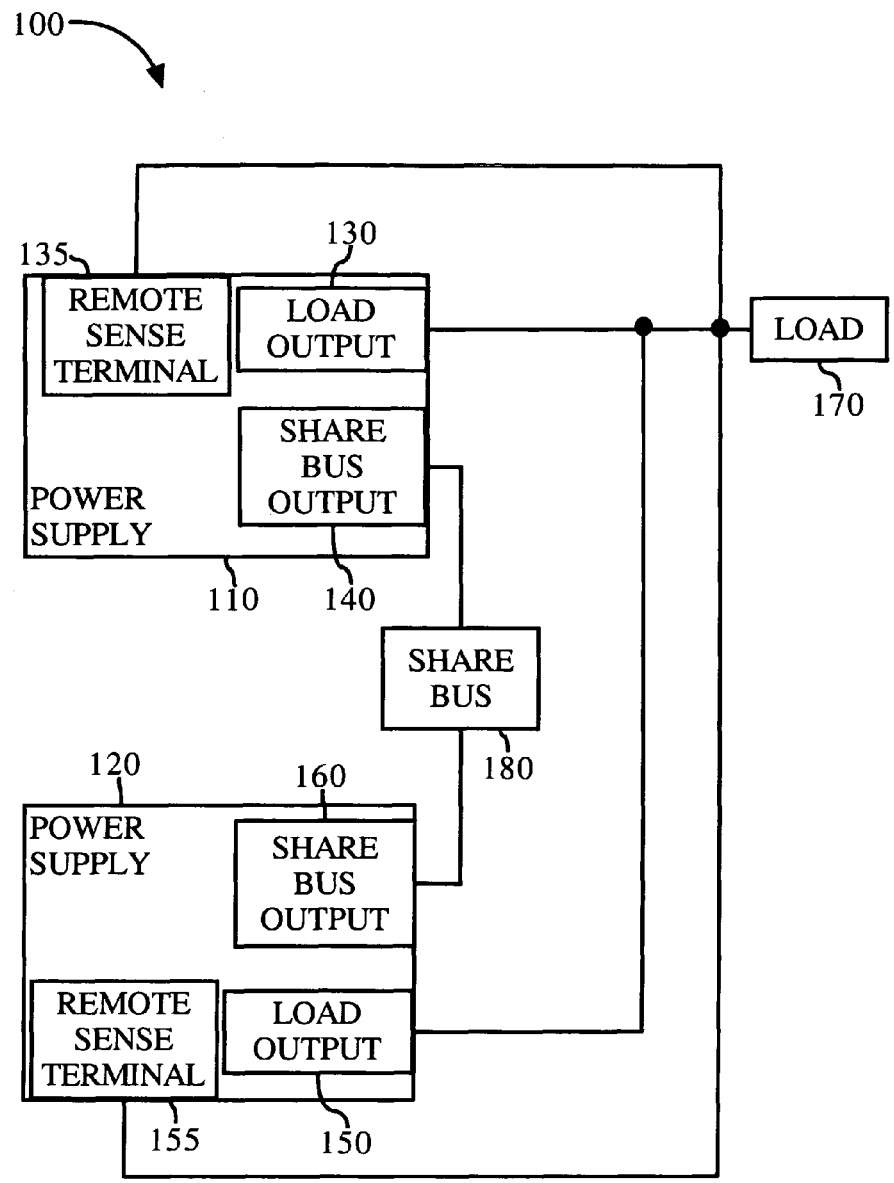
FIG. 1 is a diagram illustrating a conventional paralleled power supply system known to the art.

FIG. 1 illustrates a conventional paralleled power supply system 100. A conventional paralleled power supply system 100 may include a first power supply 110 and a second power supply 120. A first power supply 110 may include a load output terminal 130, a remote sense terminal 135 and a share bus output terminal 140. A second power supply 120 may include a load output terminal 150, a remote sense terminal 155 and a share bus output terminal 160. Conventional paralleled power supply system 100 may supply load 170 with power with approximately equal current sharing amongst the first power supply 110 and the second power supply 120 by employment of the share bus 180 coupled to share bus output terminal 140 of power supply 110 and share bus output terminal 160 of power supply 120. Remote sense terminals 135, 155 may be connected to load 170. Remote sense terminals 135, 155 may be coupled to a feedback amplifier associated with each power supply 110, 120. Remote sense terminals 135, 155 compensate for output lead losses and provide a remote point for regulation. By coupling remote sense terminals 135, 155 with load 170, power supplies 110, 120 may adjust their output parameters, such as a supply voltage, at their own output terminals to compensate for resistance of load leads, relays, connectors and the like to provide a desired output voltage at the terminals of load 170.

Power supplies 110, 120 may produce and transfer current information delivered by each power supply 110, 120 across the share bus 180. Current information may be provided through a voltage input or digital word. A power supply providing higher current may control the share bus 180 whereby the other power supply increases power delivery to match the power supply supplying the higher current. Share bus 180 may transfer current sharing information amongst power supply 110 and power supply 120 of the conventional paralleled powers supply system 100. By controlling operation of each power supply through information transmitted across the share bus 180, approximately equal current sharing amongst power supply 110 and power supply 120 may be achieved. A drawback associated with the paralleled power supply system 100 is the high cost associated with the power supplies 110, 120 which include share bus output terminals 140, 160. Power supplies 110, 120 with share bus output terminals 140, 160 cost significantly more than power supplies without share bus output terminals.

FIG. 2 illustrates a paralleling system 200. Paralleling system 200 may be employed with multiple power supplies to parallel the multiple power supplies with approximately equal current sharing amongst the multiple power supplies. Paralleling system 200 may be operable with multiple power supplies which do not require share bus output terminals while ensuring approximately equal current sharing amongst the power supplies.

Paralleling system 200 may be operable with a first power supply 210 and a second power supply 220. Power supply 210 may include a load output terminal 230 and remote sense terminal 240. Power supply 220 may include a load output terminal 250 and remote sense terminal 260. Paralleling system 200 may be coupled to each load output terminal 230, 250 and each remote sense terminal 240, 260 of each power supply 210, 220. Paralleling system 200 may parallel power supplies 210, 220 with approximately equal current sharing amongst the power supplies 210, 220 to supply a load 270 with a shared output. Paralleling system 200 may operate with the remote sense terminals 240, 260 to provide appropriate feedback to the remote sense terminals 240, 260 whereby the power supplies 210, 220 may adjust their output parameters to ensure approximately equal current sharing amongst power supplies 210, 220. Paralleling system 200 may receive output from power supply 210 and power supply 220 and may supply a pair of OR diodes to isolate one of the power supplies 210, 220 from the common output to the load 270 if one power supply should fail. Failure of a power supply may include an output of a power supply being shorted to ground. It should be understood by those with ordinary skill in the art that ground terminals (not shown) would be included for operation with the load output terminals and remote sense terminals with power supplies paralleled by paralleling system 200.

FIG. 3 is a circuit diagram illustrating a paralleling circuit 300 for paralleling power supplies. Paralleling circuit 300 may be one embodiment of paralleling system 200. Paralleling circuit 300 may parallel power supply 302 and power supply 304. Power supply 302 may include a voltage input reference 306 coupled to an error amplifier 308. Error amplifier 308 may be coupled to a controlled power output 310 which supplies power, after filtering, to the load output 312. Power supply 302 may include a remote sense terminal 314 which is operatively connected to the error amplifier 308 to allow an adjustment of the output of power supply 302 depending upon the voltage of the remote sense terminal 314.

Power supply 304 may include a voltage input reference 316 coupled to an error amplifier 318. Error amplifier 318 may be coupled to a controlled power output 320 which supplies power, after filtering, to the load output 322. Power supply 304 may include a remote sense terminal 324. Power supply 304 may include a remote sense terminal 324 which is operatively connected to the error amplifier 318 to allow an adjustment of the output of power supply 304 depending upon the voltage of the remote sense terminal 324. While power supplies 302, 304 may be paralleled by paralleling circuit 300, it is contemplated that any type of power supply may be employed. It is further contemplated that paralleling circuit 300 may be operable with any type of power supply configuration, including DC/DC power supplies and AC/DC power supplies which include remote sense terminals.

Paralleling circuit 300 may be coupled to load output 312 of power supply 302 and load output 322 of power supply 304. Additionally, paralleling circuit 300 may be coupled to remote sense terminal 314 of power supply 302 and remote sense terminal 324 of power supply 304. It should be understood that any type of junction may be employed as terminals including connectors and pins.

Paralleling circuit 300 may be coupled with the remote sense terminals 314, 324 for implementation of current sharing logic of the paralleling circuit 300 to parallel power supplies 302, 304 between the minimum and maximum specified load. Parallel controlling logic of paralleling circuit 300 may include current sensors 326, 328, operational amplifiers 330, 332, 334, 336 and a paralleling bus 342. Current sensor 326 may be coupled to the load output 312 of power supply 312. Current sensor 328 may be coupled to load output 322 of power supply 304. Current sensors 326, 328 may be any type of current sensing devices and may provide current reading information, for example, in the form of a current sense voltage, for the paralleling circuit 300. Operational amplifier 330 may be coupled to current sensor 326 and may compare an output current sense voltage of current sensor 326 for power supply 302 in comparison with a voltage across the paralleling bus 342. Operational amplifier 334 may be coupled to current sensor 328 and may compare the output current sense voltage of current sensor 328 for power supply 304 with the voltage across paralleling bus 342.

Operational amplifiers 332, 336 may each compare the voltage across paralleling bus 342 with output current sensed voltage by current sensor 326 for power supply 302 and current sensor 328 for power supply 304 to provide any necessary gain to remote sense terminals 314, 324 respectively. Thus, if the voltage of remote sense terminal 314 divided by two resistors to the inverting input terminal of error amplifier 308 is less than the voltage of voltage input reference 306, power supply 302 may increase its output to ensure approximately equal current sharing amongst power supplies 302, 304. In another example, if the voltage of remote sense terminal 324 divided by two resistors to the inverting input terminal of error amplifier 318 is greater than the voltage of voltage input reference 316, power supply 304 may decrease its output to ensure approximately equal current sharing amongst power supplies 302, 304. It is contemplated that each power supply 302, 304, may simultaneously increase/decrease or decrease/increase output to ensure approximately equal current sharing amongst power supplies 302, 304. While operational amplifiers are described, it is contemplated that other types of amplifiers may be employed without departing from the scope and intent of the present invention.

Paralleling circuit 300 may include an OR diode circuit, such as OR diodes 338, 340, which may deliver current to the load 344. Paralleling circuit 300 may also include a feedback conductor 346 for power supply 302 and feedback conductor 348 for power supply 304. OR diodes may provide isolation for power supplies 302, 304 and may prevent reverse current flow within power supplies 302, 304. OR diodes may be a conventional diode and may be a Schottky diode. In another embodiment, OR diodes may be implemented with a field effect transistor and a driver. For example, OR diode 338, 340 may be implemented as a body diode of a transistor, such as a MOSFET, whereby the transistor is turned on, shunting the body diode with a very low voltage drop when the current is moving through the body diode.

Body diodes of a MOSFET may act as output "OR" diodes as the body diodes may be shunted by the MOSFET when the MOSFETS is switched on. Current may be allowed to pass with minimal power dissipation while providing isolation for power supplies 302, 304. When current flows from the anode to cathode of a body diode of MOSFET, a driver may detect the current flow and provide a gate voltage to the MOSFET. This may cause MOSFET to turn on, allowing current to flow through from power supply 302, 304 to load 344 with minimal power dissipation. In an embodiment of the invention, MOSFET may be a very low "on resistance" type of transistor. Thus, power dissipation may be an amount of the drain to source current squared ($Ids^2$) times the drain to source resistance of the MOSFET when on (RDSon).

Reverse current flow into power supply 302, 304 may be prevented. MOSFET may be back biased which may be detected by the driver which turns the gate voltage for MOSFET 310 off. Thus, the flow of reverse current into power supply will be prevented. An advantageous aspect of the OR diode is the rate at which the MOSFET is shut off after detection of reverse current flow, typically a few microseconds.

It should be understood that driver may include any device, circuitry and the like to provide a high or low output depending upon the value of two inputs. While driver may be implemented as a comparator, such as an operational amplifier, it should be understood by those with ordinary skill in the art that other types and configurations may be utilized in order to provide the functionality of a driver. Additionally, comparator may be equipped with independent voltage supplies, resistor-capacitor filtering, and the like to provide more precise voltage monitoring by driver. Additionally, it should be understood that other types of transistors may be employed in lieu of a MOSFET to achieve similar functionality. For example, a bipolar junction transistor may be employed to operate similarly to a diode while providing low power dissipation. Additionally, it is also contemplated that the functional equivalent of a MOSFET may be implemented by those with ordinary skill in the art the by use of two MOSFETS, one transistor functioning as a switching mechanism and another transistor functioning as the body diode without departing from the scope and spirit of the present invention.

It is contemplated that current sharing may be achieved when, in the instance of a two power supply system, each power supply is providing about one half of the total load current. It is further contemplated that paralleling circuit 300 may be employed with power supply systems comprising three or more power supplies with each power supply providing an approximately equal load current. It should be understood by those with ordinary skill in the art that an approximately equal load current may be defined as each load current supplied by each power supply may be within a five percent (5%) difference of each other. For example, a first power supply may supply 52% of the load current and a second power supply may supply 48% of the load current. Since the load current supplied by the first power supply may be within 5% (e.g. a 4% difference) of the load current supplied by the second power supply, then it is contemplated that each power supply provides an approximately equal load current. However, a first power supply may supply 54% of the load current and a second power supply may supply 46% of the load current, (an 8% difference). In such a scenario, it is contemplated that each power supply is not providing approximately equal load current.

Figure 4:
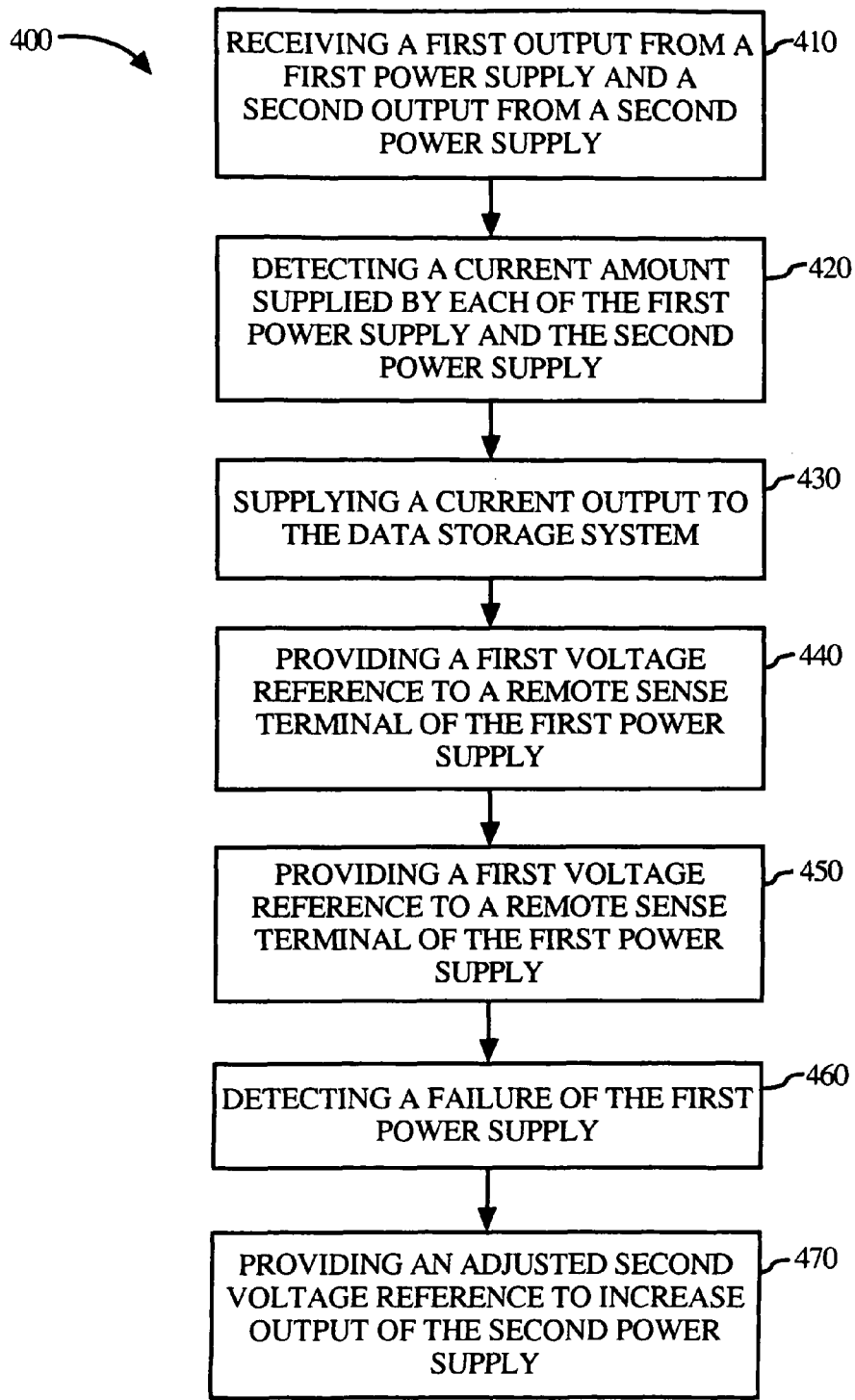
FIG. 4 is a flow diagram representing a method for supplying power for a data storage system.

Referring to FIG. 4, a flow diagram representing a method 400 for supplying power for a data storage system. It is contemplated that paralleling system 200 may execute method 400 for supplying power for a data storage system. Method 400 may begin by receiving a first output from a first power supply and a second output from a second power supply 410. Next, method 400 may include detecting a current amount supplied by each of the first power supply and the second power supply 420. Method 400 may include supplying a common output to the data storage system from the first output and the second output 430. Next, method 400 may including providing a first voltage reference to a first remote sense terminal of the first power supply based upon the current amount supplied by the first power supply 440 and providing a second voltage reference to a second remote sense terminal of the second power supply based upon the current amount supplied by the second power supply 450. It is contemplated that the first power supply and the second power supply adjust their output based upon the first voltage reference and the second voltage reference to produce the common output with current being approximately equally shared between the first power supply and the second power supply. Method 400 may include detecting a failure of first power supply 460 and providing an adjusted second voltage reference to increase output of a second power supply 470 to supply the data storage system with an appropriate current output. For example, paralleling circuit 300 may detect the lack of current output from a first power supply and accordingly the voltage reference supplied to the remote sense terminal of the second power supply may be adjusted. The adjustment of the voltage reference supplied to the second power supply may cause the second power supply to increase its output to supply an appropriate current output for the data storage system.

It is believed that the paralleling system of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:
1. A power supply system, comprising:
a first power supply, said first power supply including a first load output terminal and a first remote sense terminal;
a second power supply, said second power supply including a second load output terminal and a second remote sense terminal; and a paralleling system; said paralleling system being coupled to said first load output terminal and said first remote sense terminal of said first power supply, said paralleling system being coupled to said second load output terminal and said second remote sense terminal of said second power supply, wherein said paralleling system is configured to provide a common output, said paralleling system providing a first voltage reference to said first remote sense terminal and a second voltage reference to said second remote sense terminal whereby said first power supply and said second power supply adjust their output based upon said first voltage reference and said second voltage reference to produce said common output with a current being approximately equally shared between said first power supply and said second power supply.

2. The power supply system of claim 1, wherein said paralleling system comprises an OR diode circuit.

3. The power supply system of claim 2, wherein said OR diode circuit comprises a first OR diode and a second OR diode.

4. The power supply system of claim 3, wherein said first OR diode and second OR diode are a body diode of a transistor.

5. The power supply system of claim 1, wherein said paralleling system comprises a first amplifier and a second amplifier, wherein said first amplifier receives output from said first load output terminal and said second amplifier receives output from said second load output terminal.

6. The power supply system of claim 5, wherein said paralleling system comprises a third amplifier and a fourth amplifier, wherein said third amplifier has an output coupled to said first remote sense terminal and said fourth amplifier has an output coupled to said second remote sense terminal.

7. The power supply system of claim 1, wherein a current of said first load output terminal is within a five percent difference of a current of said second load output terminal.

8. A power supply system, comprising:
a first power supply, said first power supply including a first load output terminal and a first remote sense terminal;
a second power supply, said second power supply including a second load output terminal and a second remote sense terminal; and
a paralleling circuit for paralleling said first power supply and said second power supply, said paralleling circuit receiving an output from said first load output terminal and an output from said second load output terminal to produce a common output, said paralleling circuit providing a first voltage reference to said first remote sense terminal and a second voltage reference to said second remote sense terminal whereby said first power supply and said second power supply adjust their output based upon said first voltage reference and said second voltage reference to produce said common output with current being approximately equally shared between said first power supply and said second power supply.

9. The power supply system of claim 8, wherein said paralleling circuit comprises an OR diode circuit.

10. The power supply system of claim 9, wherein said OR diode circuit comprises a first OR diode and a second OR diode.

11. The power supply system of claim 10, wherein said first OR diode and second OR diode are a body diode of a transistor.

12. The power supply system of claim 8, wherein said paralleling circuit comprises a first amplifier and a second amplifier, wherein said first amplifier receives output from said first load output terminal and said second amplifier receives output from said second load output terminal.

13. The power supply system of claim 12, wherein said paralleling circuit comprises a third amplifier and a fourth amplifier, wherein said third amplifier has an output coupled to said first remote sense terminal and said fourth amplifier has an output coupled to said second remote sense terminal.

14. The power supply system of claim 8, wherein a current output of said first load output terminal is within a five percent difference of a current output of said second load output terminal.

15. A paralleling system, comprising:
means for receiving a first output from a first power supply and a second output from a second power supply;
means for detecting a current amount supplied by each of said first power supply and said second power supply;
means for supplying a common output to a load from said first output and said second output;
means for providing a first voltage reference to a first remote sense terminal of said first power supply based upon said current amount supplied by said first power supply; and
means for providing a second voltage reference to a second remote sense terminal of said second power supply based upon said current amount supplied by said second power supply, wherein said first power supply and said second power supply adjust their output based upon said first voltage reference and said second voltage reference to produce said common output with current being approximately equally shared between said first power supply and said second power supply.

16. The paralleling system of claim 15, further comprising means for isolating said first power supply and said second power supply.

17. The paralleling system of claim 16, wherein said isolating means comprises an OR diode circuit.

18. The paralleling system of claim 17, wherein said OR diode circuit comprises a first OR diode and a second OR diode.

19. The paralleling system of claim 18, wherein said first OR diode and second OR diode are a body diode of a transistor.

20. The paralleling system of claim 15, wherein said current amount of said first output is within a five percent difference of said current output of said second output.

* * * * *